May 9, 1967 W. S. SUTOWSKI 3,317,986
COMPONENTS FOR BALL BEARING ASSEMBLIES AND
METHOD OF MAKING THE ASSEMBLIES
Filed Feb. 11, 1965

INVENTOR.
WALTER S. SUTOWSKI
BY

United States Patent Office 3,317,986
Patented May 9, 1967

3,317,986
COMPONENTS FOR BALL BEARING ASSEMBLIES
AND METHOD OF MAKING THE ASSEMBLIES
Walter S. Sutowski, 6976 Crestview Drive,
Brecksville, Ohio 44141
Filed Feb. 11, 1965, Ser. No. 431,899
5 Claims. (Cl. 29—148.4)

My invention relates to ball bearing assemblies, the components thereof and to the method of assembling the components.

An object of my invention is to provide an improved and unique inner race member particularly adapted for facilitating the assembly of inner race member, ball bearings and outer race member.

Another object is the provision of a blank piece for an inner race member of a bearing assembly formed for economical and efficient assembly into a bearing device and which produces an improved device.

Another object is the provision of a novel and unique method of assembling components to produce an improved ball bearing device.

Another object is the provision of an improved ball bearing device having unique structural characteristics.

Other objects and a fuller understanding of the invention may be had by referring to the following description and claims, taken in conjunction with the accompanying drawings, in which:

Figure 1:
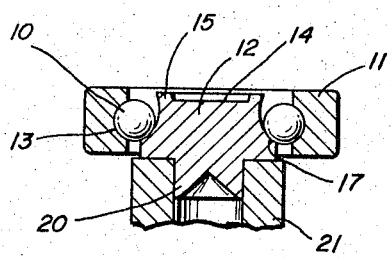
FIGURE 1 is a cross-sectional view of the parts of a ball bearing device prior to final assembly and showing the structure of my improved blank for the inner race member.

It is to be understood that the bearing device shown in the drawings has annular inner and outer race members and a plurality of balls arranged in a circle between the two race members in opposed raceways formed in the race members. As the invention is best understood by cross-sectional views taken axially through the bearing device, such cross-sectional views have been shown in the drawings.

There is provided an outer race member 11 having a raceway or groove 13 formed on the inner wall thereof. The outer race member 11 is solid or non-split. Positioned in the raceway 13 of the outer race member 11 are a plurality of ball bearings 10 arranged in a circle. As seen, the wall of the raceway 13 complements the outer spherical surface of the balls 10 engaging the raceway 13.

Figure 2:
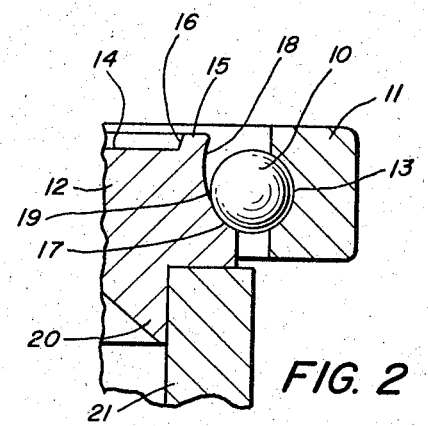
FIGURE 2 is an enlarged sectional view of the arrangement shown in FIGURE 1 and taken through one side of the assembled parts.

The blank piece for forming the inner race is a machined piece of metal which is relatively upsettable by a pressing or forging operation, such as mild steel or the like. It has sufficient hardness to provide a good inner race member but has the required characteristics for being upset and formed as herein described. The core or blank 12 as seen in FIGURES 1 and 2 has an annular shoulder 17 extending therearound. This shoulder 17 has a curvature extending axially of the core 12 which conforms or complements the curvature of the balls 10. Thus, the shoulder 17 is adapted to form a portion of the complete raceway to be made on the inner race member.

On the upper end of the core or piece 12 as seen in the drawings, there is a flat end 14, the piece 12 being substantially solid. Extending around the flat end 14 there is an annular flange 15 which extends upwardly in a direction away from the shoulder 17. This flange 15 has an inner inclined wall 16 which slopes upwardly and outwardly from the flat end 14.

Extending between the free end of the flange 15 and the curved surface forming the annular shoulder 17 is an outer annular wall 18. This outer annular wall 18 is curved in an axial direction on a radius which is larger than the radius of the curvature of the annular shoulder 17. The curvature of the annular wall 18 and the curvature of the annular shoulder 17 meet at a location indicated in FIGURE 2 by the reference character 19. Here the curved surfaces meet and blend without leaving an annular ridge or projection.

Figure 3:
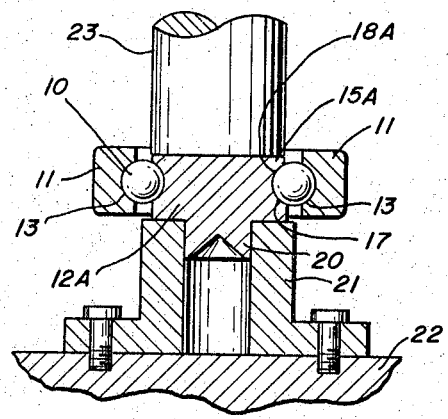
FIGURE 3 illustrates the structure and arrangement of the parts after the completion of a step taken in the assembly method.

The parts are first positioned in the arrangement shown in FIGURE 1 with the inner race member or core 12 resting upon a cylindrical support 21. The balls 10 positioned in the raceway 13 of the outer race member 11, together with the outer race member 11, are moved downwardly to the position shown in FIGURES 1 and 2 so that the balls 10 rest upon the annular shoulder 17 and prevent further downward movement of the race member 11 relative to the inner race member 12. The cylindrical support 21 is carried by a supporting base 22 so as to receive the force imposed on the inner race member during assembly. A punch or pressing head 23 is forcibly brought down against the upper end of the inner race member 12 as shown in FIGURE 3. The diameter of the punch 23 is substantially the same as the maximum diameter of the inner race member 12. The punch 23 causes the flange 15 to be displaced radially outwardly and downwardly toward the shoulder 17 and over the balls 10 whereby the wall 18 assumes the same curvature as the balls 10 and thus also the same curvature as the annular shoulder 17. In this upset or displaced condition, the flange 15 is shown as displaced metal portion 15A and the curved wall 18 is shown as the newly curved wall 18A. Thus, in FIGURES 3 and 4, flange 15 now has the form 15A and wall 18 now has the form 18A. The blank or core 12 after the operation shown in FIGURE 3, is designated by the reference character 12A to distinguish it from its prior shape and form. Together, the curved surface of the annular shoulder 17 and the curved wall 18A form the raceway on the inner race member 12 for the balls 10. The curvature of this newly formed raceway complements the curvature of the balls and permits free rolling movement of the balls 10 in the opposed raceways of the inner and outer race members.

It is to be noted that by the inclination of the wall 16 and of the wall 18, the flange 15 is tipped or inclined radially outwardly so that upon the punch 23 coming downwardly upon the supported inner race member 12A, the flange tends more readily to be displaced radially and downwardly and thus the form of the flange facilitates the upsetting operation.

The lower end of the inner race member 12A has a counterbored projection 20 provided for assembling the bearing device to a support, such as a steel plate 26. The construction of the inner race member 12A is particularly adapted for the later assembling of the device to the plate 26, as illustrated in FIGURE 4.

Figure 4:
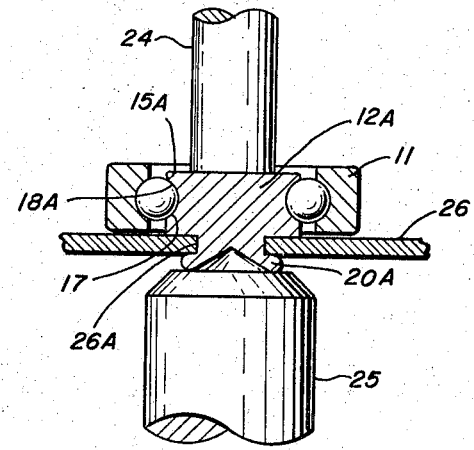
FIGURE 4 is a cross-sectional view of the improved bearing device shown being mounted to a supporting plate.

Here, the assembly as shown in FIGURE 3 is removed from the cylindrical support 21 and placed with the projection 20 extending through an opening 26A in plate 26, and the projection 20 is supported by a punch 25 having a nose formed for entering the counterbore and spreading it so as to form the spread or expanded projection 20A shown in FIGURE 4. By reason of the flat end of the inner race member 12A and its solid construction, a punch 24 may readily engage the top of the inner race member 12A and press it downwardly so as to squeeze or compress the inner race member 12A between punch 24 and punch 25.

By reason of the spreading outwardly and downwardly of the flange 15 to form the displaced flange portion 15A, the operation is sometimes referred to as "mushrooming" the inner race member and the formed inner race member 12A as being "mushroomed." The unique core forming the inner race member 12 before mushrooming is particularly adapted for the novel and useful method of assembly herein described. The advantages of the method and the important benefits of the device thus assembled are appreciated by those knowing the problems and shortcomings of the present art.

The present disclosure includes that contained in the appended claims, as well as that of the foregoing description.

Although this invention has been described in the preferred form and preferred practice with a certain degree of particularity, it is understood that the present disclosure of the preferred form and practice has been made only by way of example and that numerous changes in the details of construction and the combination and arrangement of parts and steps may be resorted to without departing from the spirit and scope of the invention as hereinafter claimed.

What is claimed is:

1. The process of assembling a ball bearing device composed of inner race member, outer race member and a plurality of balls interposed therebetween, comprising the steps of, providing an outer race member having an annular raceway formed inwardly thereof, providing an inner race member of peenable metal having an annular shoulder forming a portion of an outer raceway outwardly thereof, said shoulder being curved on a first radius complementing the radius of a said ball, said inner race member having a solid end surrounded by an annular flange extending therearound, said annular flange extending around the inner race member at an axial distance from said shoulder and protruding in an axial direction away from said shoulder, said flange and inner race member having an outer wall extending from said shoulder and being curved on a second radius greater than said first radius, said flange having an inner inclined wall sloping upwardly and outwardly from said solid end, said outer wall of the flange correspondingly sloping upwardly and outwardly for inclining said flange radially outwardly, arranging the race members concentrically with the balls disposed therebetween and the race members supported with said shoulder directed upwardly, pressing the flange of said inner race member downwardly to peen the flange outwardly over said balls to displace said outer wall from said second radius to said first radius whereby the said shoulder and outer wall provide an outer raceway on said inner race member for said balls.

2. The process as claimed in claim 1, and in which said inner race member has a substantially flat end bounded by said flange and in which said flange in being pressed downwardly is flattened to substantially the plane of said flat end.

3. The process as claimed in claim 1 and in which said pressing is done by a flat-faced punch moving against said flange pressing the flange to flatten the same to a flat plane at the axial end met by the punch while peening the flange over said balls.

4. The process of assembling the balls in the raceways of opposed inner and outer non-split race members, comprising the steps of, forming the inner raceway of a metal displaceable under pressure with an annular shoulder curved on a radius complementing the radius of a said ball and with an annular flange extending axially of the inner raceway from a first end thereof in a direction away from the said shoulder, said annular flange being inclined radially outwardly from said first end and the outer wall of the flange being inclined radially outwardly of the outer race member, said flange having an inner annular wall inclined outwardly from said end to provide a surface to be met by the end of a downwardly directed punch, placing balls on said shoulder and in the raceway of said outer race member while supporting the said race members in concentric nested arrangement, and mushrooming the first end of the inner race member by pressure thereon by a downwardly directed punch meeting said inclined inner wall to displace said flange radially outwardly and downwardly over said balls to form together with said shoulder an outer raceway for said balls in said inner race member.

5. A blank piece for an inner race member adapted for assembly in a ball bearing assembly of inner race member and outer race member having a plurality of balls arranged in a circle within opposed raceways of the registered race members, said blank piece being a core of upsettable metal, said core having an annular shoulder extending therearound, said shoulder having a curvature generated on a first radius corresponding to the radius of each said ball to provide a portion of the raceway of said inner race member, said core having an annular flange protruding from an end thereof in a direction away from said shoulder, said shoulder having inner and outer concentric walls inclined axially and radially outwardly to facilitate the upsetting of the flange outwardly and axially by an axially directed punch against the blank piece to cause the flange to flow toward said shoulder, said core having an outer wall extending from adjacent the end of said flange toward said shoulder, said outer wall having a curvature generated on a second radius greater than the said first radius, said second radius being such that upon the upsetting of the said flange to cause the flange to be displaced outwardly and axially toward said shoulder said outer wall assumes a curvature generated on said first radius to form the other portion of the raceway on said inner race member.

References Cited by the Examiner

UNITED STATES PATENTS

| | | | |
|---|---|---|---|
| 1,910,208 | 5/1933 | Gronberg et al. | 308—3.8 |
| 2,998,636 | 9/1961 | Spence et al. | 29—148.4 |

MARTIN P. SCHWADRON, *Primary Examiner.*

FRANK SUSKO, *Examiner.*